United States Patent [19]

Kohl

[11] 4,394,726
[45] Jul. 19, 1983

[54] DISTRIBUTED MULTIPORT MEMORY ARCHITECTURE

[75] Inventor: Wayne H. Kohl, LaCrescenta, Calif.

[73] Assignee: The United States of America as represented by the Administrator of the National Aeronautics and Space Administration, Washington, D.C.

[21] Appl. No.: 258,623

[22] Filed: Apr. 29, 1981

[51] Int. Cl.³ .................. G06F 9/22; G06F 13/00
[52] U.S. Cl. .................. 364/200; 364/900
[58] Field of Search ... 364/200 MS File, 900 MS File

[56] References Cited

U.S. PATENT DOCUMENTS

| | | | |
|---|---|---|---|
| 4,159,532 | 6/1979 | Getson, Jr. et al. | 364/900 |
| 4,181,936 | 7/1980 | Kober et al. | 364/200 |
| 4,219,873 | 8/1980 | Kober et al. | 364/200 |
| 4,225,942 | 9/1980 | Kobs et al. | 364/900 |

Primary Examiner—Harvey E. Springborn
Attorney, Agent, or Firm—Paul F. McCaul; John R. Manning; Thomas H. Jones

[57] ABSTRACT

A multiport memory architecture is disclosed for each of a plurality of task centers (11, 20, 30, 40) connected to a command and data bus (10). Each task center, (such as the center 11) includes a memory (13) and a plurality of devices (12, 14, 15, 17) which request direct memory access as needed. The memory (13) includes an internal data bus (53) and an internal address bus (50) to which the devices are connected, and direct timing and control logic (54) comprised of a 10-state ring counter (62) for allocating memory devices by enabling AND gates (64) connected to the request signal lines of the devices. The outputs of AND gates connected to the same device are combined by OR gates (66) to form an acknowledgement signal that enables the devices to address the memory during the next clock period. The length of the ring counter may be effectively lengthened to any multiple of ten to allow for more direct memory access intervals in one repetitive sequence. One device is a network bus adapter (14) which serially shifts onto the command and data bus (10) a data word (8 bits plus control and parity bits) during the next ten direct memory access intervals after it has been granted access. The NBA is therefore allocated only one access in every ten intervals, which is a predetermined interval for all centers. The ring counters of all centers are periodically synchronized by DMA SYNC signal to assure that all NBAs be able to function in synchronism for data transfer from one center to another.

9 Claims, 5 Drawing Figures

DISTRIBUTED MULTIPORT MEMORY ARCHITECTURE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a system for data processing, and more particularly to a separate multiport memory architecture for each of a plurality of task centers in a bus oriented, distributed data processing network.

A distributed data processing network is a preferred architecture for use of the new microprocessor technology. In a complex system, such as a spacecraft command and data system, separate microprocessors may be assigned the various tasks which are best carried out independently, but which require some communication and coordination between the task centers.

By distributing the data processing capability of a system to task centers, many instruments and sensors are converted into "intelligent" instruments and sensors. These task centers can process their own raw data to a desired extent, thus reducing the volume of raw data to be transferred for transmission, storage or further processing. In spacecraft, this reduces the load on the telemetry and communication systems. However, this limited computational ability of autonomous task centers must have communication and be coordinated with other task centers. This is best accomplished through a common bus to which each is coupled by a network bus adapter (NBA). The usual practice is to provide a buffer memory in the NBA, from which the microprocessor transfers the data to its dedicated memory for processing. Function devices associated with the microprocessor have access to that memory only under control of the microprocessor. It would be desirable to have direct memory access for each device associated with a microprocessor, as well as the microprocessor itself, on a time sharing basis.

SUMMARY OF THE INVENTION

In accordance with the present invention, a distributed data processing system is comprised of task centers interconnected by a system (serial command and data) bus. Each center has a multiport memory that is connected to one or more using devices and is coupled to the bus by a network bus adapter (NBA). The using devices connected to the memory may include a microprocessor. The memory of each task center includes an internal parallel data bus and an internal parallel address bus to which the bus adapter and other devices are connected for direct memory access (DMA). Also included is logic means for DMA timing and control of access to the memory by the devices in a time sharing mode which treats the NBA the same as all other devices. This timing and control is effected by a ring counter driven by a system clock pulse and periodically resynchronized by DMA sync pulses distributed to the task centers. Each ring counter produces NX intervals, where N is an integer that is the same for all centers, such as 10, and X is an integer that is selected for each center, depending on the needs of the individual centers for servicing all using devices during each group of NX intervals. For another aspect of the invention, which will become apparent from the summary below, the integer N is purposely selected to be 10 for synchronously transferring 10-bit words over the system bus.

During each group of the NX intervals in a task center, a different one of NX gate means is enabled by the ring counter to transmit a DMA request signal from whichever device connected thereto is requesting memory access. Since some devices may require more frequent memory access than others, such as the microprocessor, the memory access request signal from that device may be connected to more than one gate means, such as every other one enabled by the ring counter while other devices may be connected to only one or two of the gate means.

All gates connected to a common device are connected to a single means which acknowledges the request thus transmitted by the gate means. The acknowledgement enables the device requesting access to place an address on the internal address bus and to either accept data thereafter placed on the internal data bus or to place data on the internal data bus. The address thus placed on the internal address bus includes a read/write control signal. A device will always signal either a read or a write function each time it requests memory access. In that manner, as the NX gate means are sequentially enabled during the NX intervals, memory access is assured for each device requesting access at least once during each full cycle of the ring counter.

In the distributed data processing system, each multiport memory and its associated devices constitutes a center for the processing of data independent of all other data processing centers. Collision of data on the bus is avoided by a bus controller in one task center which directs data transfers between task centers by determining from a table stored in memory which should transmit and which should receive data transferred in the usual way, while other centers go about their own tasks. This assures command and data bus operation in a time-shared mode, with controlled and synchronized operating times one the bus for the various distributed task centers. Order is thus maintained by the bus controller while the task centers operate autonomously within blocks of time synchronized by the system clock and DMA pulses and intercommunication between task centers occur in strict synchronism.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
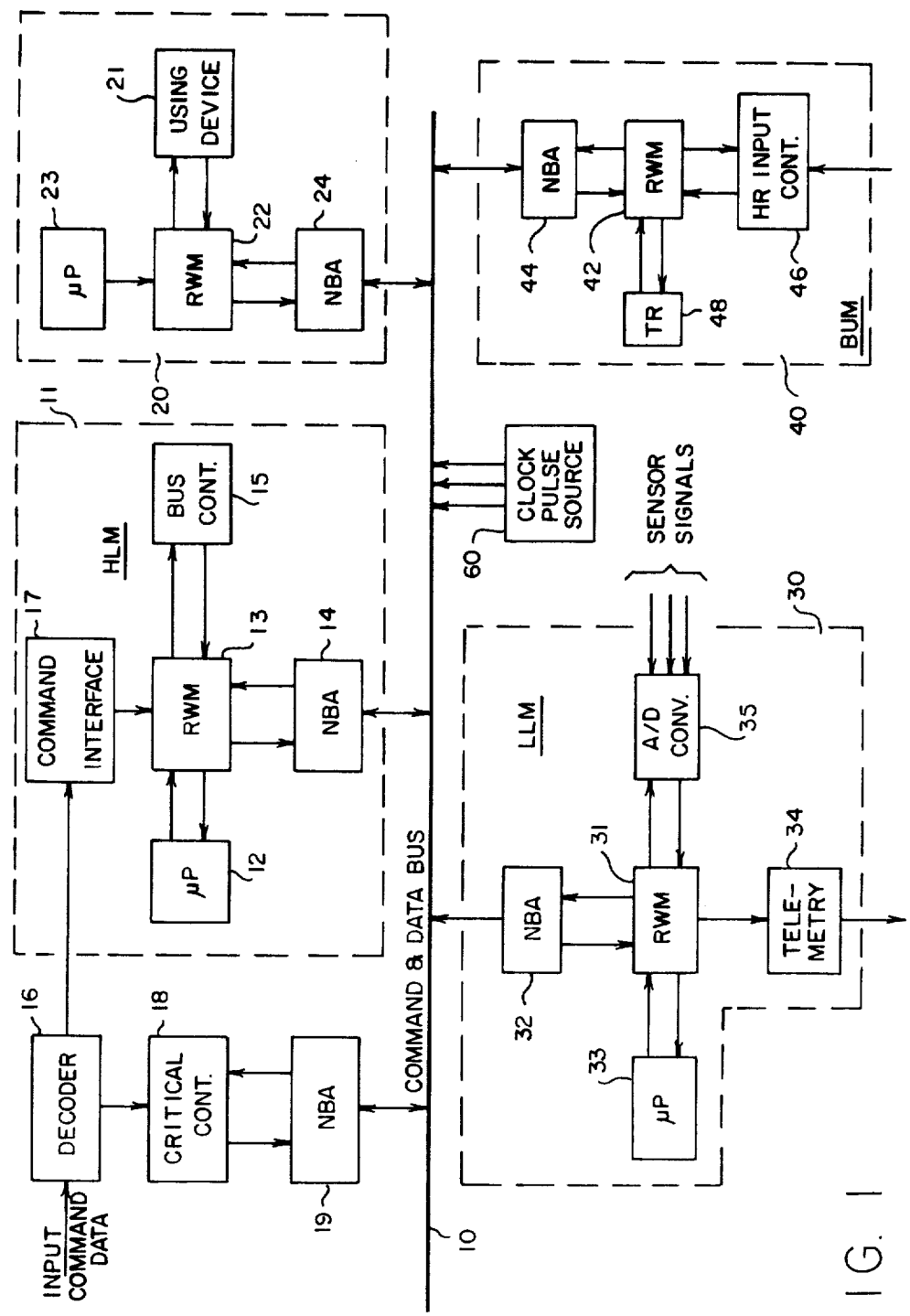
FIG. 1 is a functional block diagram of a distributed data processing system utilizing multiport memories at the task centers or modules for direct memory access by all associated devices which may include a microprocessor, and which include a network bus adapter, with a bus controller in one module for the system to permit use of a command and data bus in a controlled manner by all of the centers connected to the bus.

As shown in FIG. 1, a distributed data processing network is provided by a plurality of task centers, or modules, of which four are shown by way of example, each connected to a serial command and data bus 10. One high level module (HLM) 11 contains a microprocessor ($\mu$P) 12, such as an RCA 1802 microprocessor operated at a clock frequency of 1.6128 mHz and a read/write memory (RWM) 13 for storage of 32K words of eight bits, each with parity error detection. In addition, the HLM contains a network bus adapter (NBA) 14 which enables data to be entered into or extracted from the memory via the bus 10. The HLM also has a bus controller (BC) 15 which is dedicated to the bus 10 for moving blocks of data between memories of all task centers connected to the bus 10. The bus controller operates independently from the microprocessor. It reads a control table directly from the memory 13 to specify the routing and priority of bus transfers. Thus, the bus 10 is controlled by the HLM.

A decoder 16 provides the basic communication path of input command data to the distributed data processing network. The input data may consist of a first type of commands to the high level module, such as for programming the operation of the bus controller 15. Briefly, the bus controller 15 puts data into the proper format, sends a data address header out on the bus, which describes the source and recipient bus adapter(s). Immediately thereafter, it extracts data from the source bus adapter one 10-bit word or byte at a time and serially transmits each word on the bus for reception by the recipient adapter(s). Bus operation is thus in a time-shared mode, with table controlled time sequences for uplinked commands and data transfers between data processing centers while devices at each center may engage in internal data transfers in independent and parallel processes. Consequently, there is no possibility of data collisions on the system bus; only one data word is permitted on the system bus at any one time, but independent of internal bus utilization of the task centers. The NBA of each task center provides the necessary one-word buffer memory for data to and from the bus 10.

A command interface 17 couples the decoder to the memory 13 of the HLM. For access to the memory, the command interface, microprocessor, bus controller and network bus adapter are each considered to be simply a "device" which must request direct memory access when needed.

The input data may also consist of a second type of commands which are routed to a critical controller 18 which acts on the commands to control the distributed data processing system through dedicated lines (not shown) independent of the command and data bus 10. Its primary role is to protect critical functions and establish the configuration of the system.

Other modules are illustrated by way of example, such as a module 20 for some using device 21 which shares a memory 22 with a microprocessor 23 and a network bus adapter 24 in the same manner in which the bus controller, or microprocessor of the module 11 share a memory. Similarly, a low-level module (LLM) 30 has a memory 31 shared by a network bus adapter 32, a microprocessor 33, and telemetry 34 for providing information from sensors in the form of signals converted from analog to digital form by a converter 35 which uses the memory 31 as a buffer memory. Another type of module 40 is unique in that it includes a read/write memory 42, a network bus adapter 44, a high rate input control buffer 46 for high rate scientific data input, and a tape recorder 48. The function of this module is that of bulk memory (BUM) only. It does not include a microprocessor.

Figure 2:
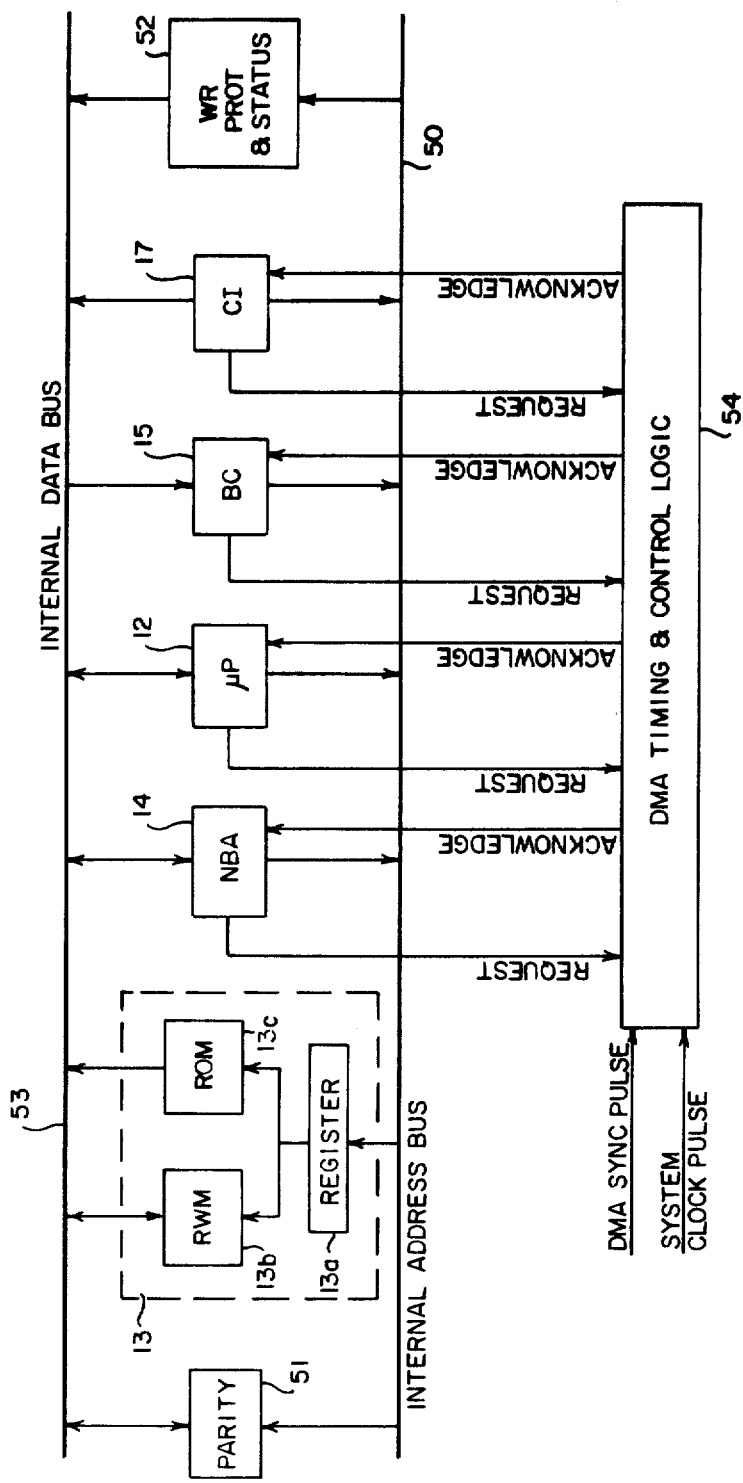
FIG. 2 illustrates the manner in which each multiport memory is connected by an internal address bus and an internal data bus to devices for direct memory access (DMA) under control of DMA timing and control logic responding to system clock pulses and a sync pulse from a common source.

This rather generalized system illustrates not only a typical environment for the invention which relates to the memories of the task centers, but also a system feature of the invention which takes advantage of the multiport memories of the task centers. That feature is the ability of data transfer from any one multiport memory to another through the system bus, thus linking all memories of distributed task centers in to effectively one multiport memory. Each multiport memory includes as a functional part thereof an internal address bus, an internal data bus and DMA timing and control logic as shown in FIG. 2 for the HLM of FIG. 1. The DMA timing and control logic similarly provided for every module is independent but synchronized with each of the other modules.

Referring now to FIG. 2, the internal parallel address bus, designated by the reference numeral 50 is connected to the microprocessor 12, memory 13, network bus adapter 14, and the bus controller 15 to form a completely independent task center. Also included, as desired, may be additional devices or functions, such as a parity check function 51 and a write/read protection and status function 52 which are put into operation as the memory is addressed. Data to and from the memory is through an internal parallel data bus 53. For a high speed memory, the memory is addressed directly from the address bus, but for a slower memory, an address register 13a may be included to latch the address codes. The memory may be divided into a read/write memory 13b and a read only memory 13c, as desired. The unique part of the task center is the manner in which direct memory access is controlled by DMA timing and control logic designated by a functional block 54.

Figure 3:
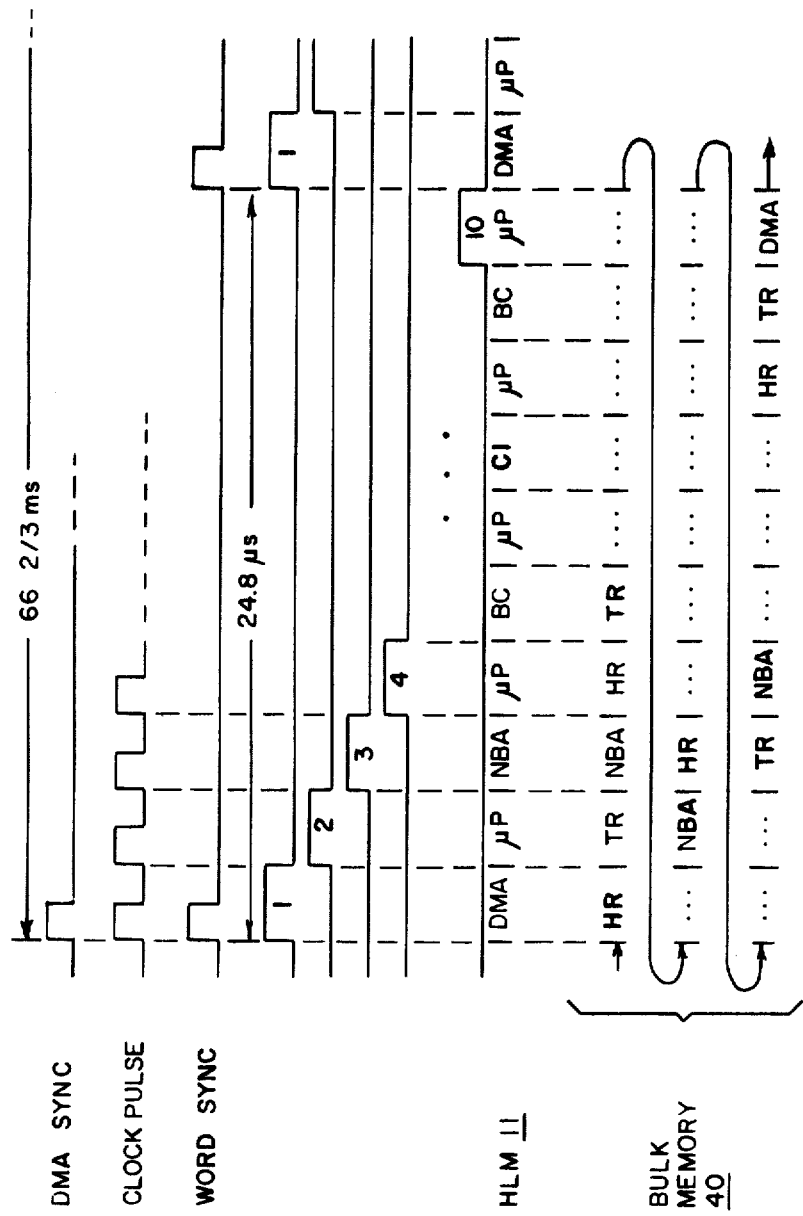
FIG. 3 is a basic timing diagram for the DMA timing and control logic of FIG. 2.

The timing function of the control logic 54 is illustrated by the timing diagram in FIG. 3. The DMA timing and control logic receives clock pulses for timing NX intervals, where N is conveniently selected to be N bit times of a word serially transmitted, such as 10 (8 bit byte plus parity and control bits), and X is an integer such as one in this example, or any other number such as three in other task centers, for providing the minimum number of intervals in groups of NX necessary to service all devices. The number X thus allows a task center to be uniquely designed for its task. For example, if a great volume of data processing will involve very frequent memory access by a microprocessor and possibly by another device as well, X may well be selected to be three so that in three word times, each of the other devices (one or more) will be given memory access at least once during one sequence of NX timing intervals. Then the pattern is repeated.

For the HLM the number X is one, so there are only ten intervals during one NX sequence of the DMA timing and control logic. During this sequence, the memory access request of the microprocessor is sampled five times (every other clock pulse interval), and if the request signal line is up, the DMA transmits an acknowledgement signal to give the microprocessor direct memory access. During the remaining (odd numbered) intervals, the memory access request line of the other devices are sampled, and if up, the other devices are given direct memory access in a similar manner. Note that one interval designated DMA is reserved for the DMA timing and control logic should it be designed to include some function besides DMA timing that requires memory access, a possibility that goes beyond the scope of this invention, or should other devices be added.

In the event that X is selected to be greater than one, the 10-interval sequence is repeated three times, but each time with a different interval distribution pattern for access request and acknowledgement. FIG. 3 illustrates exemplary distribution patterns for the high-level module 11 and for the bulk memory module 40. Note that the bulk memory module requires three 10-interval cycles for the pattern. That may be achieved by simply adding a 2-bit counter to the logic means to count the ring counter cycles. The output of that 2-bit counter is then used to gate the outputs of the ring counter to first one set of gate means for sampling memory access requests from the devices to a second and then a third set of gate means. The single set of gate means for a 10-interval cycle will therefore illustrate the manner in which the present invention may be implemented.

Figure 4:
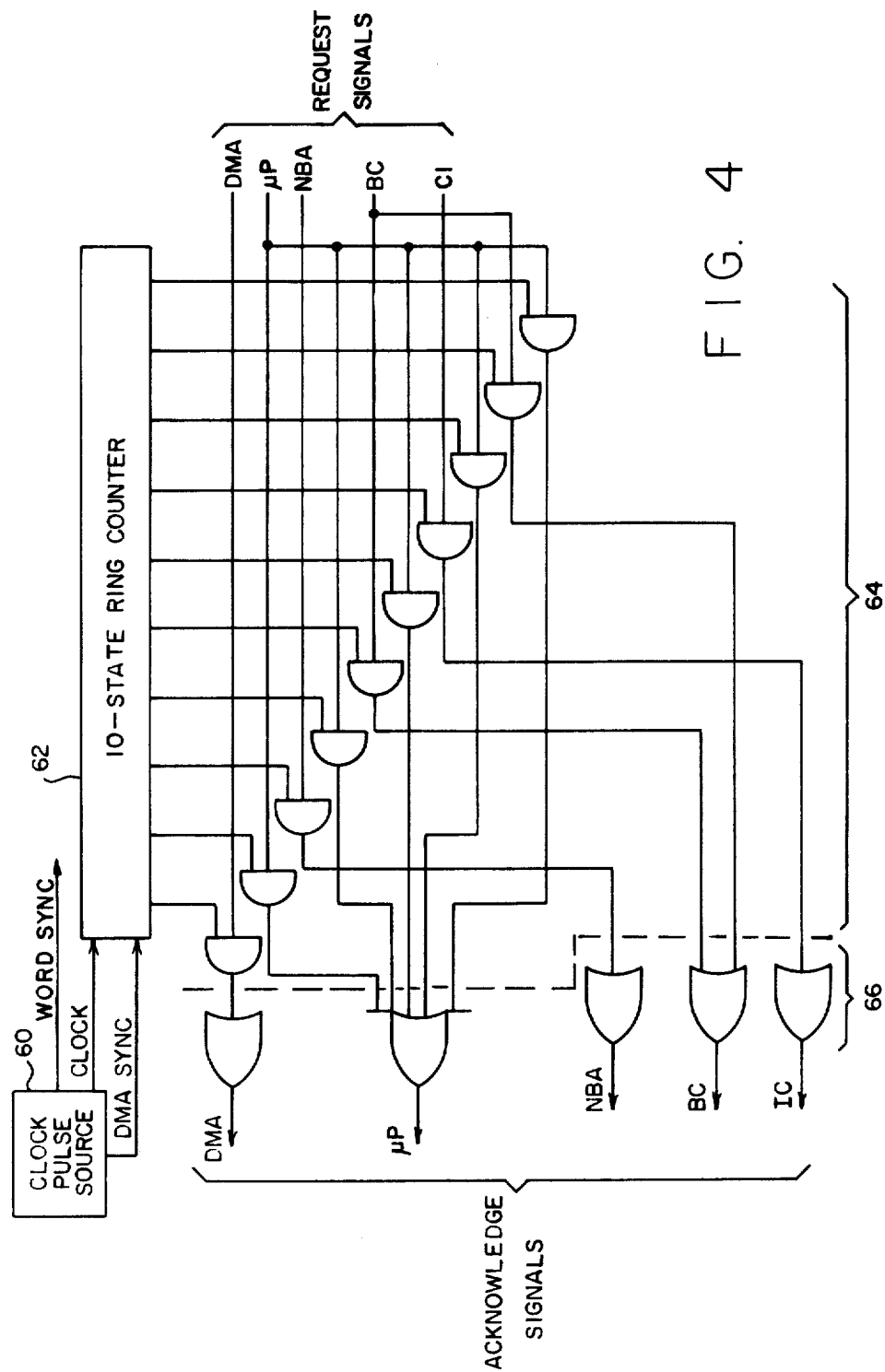
FIG. 4 is a generalized logic diagram of means for generating the timing sequence illustrated in FIG. 3 for an exemplary task center.

Referring to FIG. 4, a DMA sync pulse from a source 60 sets a 10-state ring counter 62 to its first state every 66.67 ms. The next clock pulse from the source 60 then sets the counter to its second state, and each clock pulse thereafter occurring at 2.48 μs intervals advances the counter to the next state. When the tenth state has been reached, the counter simply steps to the first state. The 10-state sequence is repeated every 24.8 μs. Each of the outputs of the counter 1 through 10 is connected to a separate one of a group of ten AND gates 64. The second input to each gate is then connected to a device which may request memory access at random by transmitting a request signal. When the gate connected to a device requesting access is enabled by the ring counter, it transmits an acknowledgement signal to the device which then stops transmitting the request signal, i.e., which resets a request flag at the device, and enables the device to place a memory address on the internal memory bus 50, and to receive or transmit data via the internal data bus 53. A read or write control signal is gated to the memory via the internal address bus along with the address.

Each device may be connected to more than one AND gate, as shown in FIG. 4 to implement the memory access pattern shown in FIG. 3 for the high level module. The acknowledgement outputs of the AND gates connected to the same device are connected to the same one of a group of OR gates so that from the group of AND gates there are only as many acknowledgement signals as there are devices to be granted memory access. In that way, every device is granted memory access one or more times every 10-bit word time (24.8 μs). Once every 66.67 ms, all DMA timing and control logic is resynchronized by the DMA sync pulse from the source 60. Since the source 60 is common to all task centers, the memory access cycles are always synchronized, but should any one ring counter fall out of step, it will be resynchronized at the end of the 66.67 ms timing interval.

It should be noted in the timing diagram of FIG. 3 that memory access is allocated to the NBA once for every 10 clock pulses, which is once for every serial word time on the system bus. A word sync pulse is also generated by the clock pulse source 60 to indicate the end of a data word (8 bits plus control and parity bits). These word sync pulses are used by the centers to load a previously accumulated word in the bus adapter into the memory and to start receiving the next word on the bus or to stop serial transmission onto the bus and to read the next word to be transmitted from memory. Its position in the sequence of ten clock pulse periods is selected to allow ample time for the NBA to carry out its signal conditioning and data conditioning functions for the center's bus interface capability when transmitting data on the bus 10. The NBA also continually monitors data on the bus and determines when and how the center is to interact with messages. It has a one-word buffer memory for storing data to be transmitted or data being received. The NBA also routes the data to and from the desired locations in the multiport memory of the system.

Before proceeding with a discussion of the system aspects of this multiport memory architecture, it should be understood that the system embodying this invention is to be a well disciplined system in which all commands are stored in the memories of the task centers (along with their execution times) for execution at a later time as part of a preplanned and prestored sequence. The prestored sequence involves not only the stored commands but also the table for the bus controller in order that data may be transferred from one center to another when required. The transfer is made one data word at a time, where each word consists of eight bits with a leading control bit and a trailing parity bit added. Internal to a task center, a word is typically 8 bits, but can be 16 bits. Whenever a 16-bit word is transferred on the bus 10, it is divided into two bytes, each of which becomes part of a 10-bit word actually transmitted serially by the source NBA.

The data system bus protocol is designed to allow some interfacing flexibility so that the various task centers may efficiently communicate with each other in carrying out various transactions. The basic format and maximum size of those transactions are defined for all bus transfers according to the particular application of the system. The data transferred will reach all network bus adapters, but the unique address codes of the data transferred prevent them from affecting nonintended centers. The only allowable addressing modes and the specific protocol configuration for the various types of bus traffic will now be described.

Because of the varied needs of the different centers, the protocol allows different modes of information transfer. An external DMA channel can use the format header information to direct data transfers. If only an internal microprocessor controlled DMA channel is used, other means shall be used to specify local memory addressed for the transfers. The following paragraphs provide a brief description of the two allowable addressing modes namely an immediate and a nonimmediate addressing mode. Use of one or the other is required.

The immediate addressing mode requires an external DMA channel within the task center. In this mode, the two bytes following the recipient (source) code in the header specify the memory location into (from) which data is to be loaded (extracted). The contents of the operand explicitly define the memory location. The memory address words in the header are used to set the starting address for a data transfer. The transfer may be any kind: i.e., command, data collection, monitor, or memory load.

The nonimmediate addressing mode is required where only the internal DMA is available. In this mode the microprocessor of a center controls the starting address of a data transfer by its own internal program. The memory address word in the supervisory command header is ignored. Therefore, the address preparations for data transfers within a nonimmediate task center is the responsibility of that task center. The bus controller provides the bus transaction management function for the system using a table stored in the HLM memory 13. At the next DMS sync pulse, the table is read out of memory and used by the bus controller to transfer data between memories connected to the bus by their respective network bus adapters. For each transfer, the bus controller uses message header data obtained from the HLM memory, adds control and parity bits to each 8-bit byte and channels reply data from the data source into a supervisory line on the bus. The supervisory line is a simplex data channel in the bus which carries control and data information to the various task centers.

Figure 5:
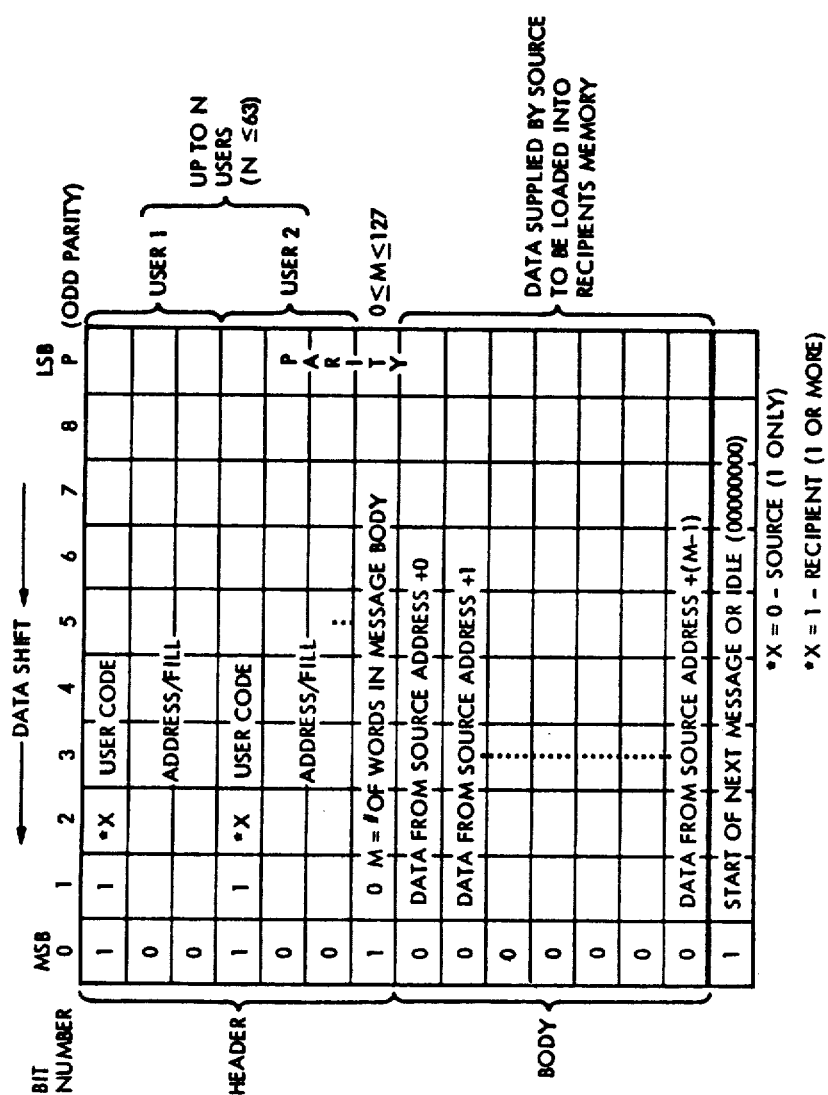
FIG. 5 illustrates the message format for the command and data bus in FIG. 1.

The bus message format will now be described in detail. Since the bus 10 is simply a memory transferring medium, the only information which appears on the bus is: what center memory is to be interrogated for data (the source, or transmitter), what center memory is to be loaded with this data (the destination, or recipient); and the data itself. The generalized bus message format is shown in FIG. 5. The bus protocol provides for multiple recipients to be addressed for any given data transfer. In the event that there is only one recipient, as will be the case in the majority of the transactions, the end of the header and beginning of the body of the message follow immediately. A repetitious 10-bit idle pattern (1000000000) is continuously transmitted on the supervisory line of the bus until a message transmission is initiated. Each message consists of a header followed by a body. The header contains a number of words of 10 bits each, that number depending on the number of recipients. Header words are grouped into 3-word triads defining a single source, and one or more recipients of the message. (The source may not be a recipient of the same message.) The first word of each triad has two 1's (11) as its leading bits (bits 0, 1). Bit 2 is 0 for the source and 1 for each recipient. Bits 3 through 8 contain the user codes. Specific user address codes are predetermined. The following two words in each triad are used to specify the starting address in the center's memory to which, or from which, the data in the message is transferred. Specific addresses for each function are also predetermined. Thus, the bus control header contains control information consisting of groups of 3 words followed by a final word. Each 3-word group identifies a task center, and the first of the three words of a group indicates whether the center is a source or a recipient, and a 16-bit address in memory for the beginning of the data transfer. The final word tells the bus controller how many words (data bytes plus control and parity bits) are to be transferred and informs the participants that the transfer is about to begin. The transfer consists of 0 to 127 words and it is terminated by the bus controller before starting another bus transfer. A typical data transfer involves the bus controller which manages the bus transaction, a single bus adapter of the task center which is selected as a data source, and the one or more bus adapters of task centers which are selected as data recipients. Bus controller instructions are passed over the supervisory line to the bus adapters. The reply data is passed over a reply line in the command and data bus after having been selected as one signal path out of many. This allows the controller to retain management of traffic on the supervisory line.

The last control word is a filler to allow sufficient time for the source to extract the first word from its memory and start placing the data on its reply line of the bus. This word contains the number of data bytes in the body of the message. The "body" following this control word is the data from the source's memory. The bus controller controls the data from the source's reply line and places it onto the bus. The controller continues to do this until it has placed a specified number (from 0 to $127_{10}$) of words onto the bus, at which time a new control word is placed on the supervisory line (may be the idle sequence). The transfer of data bytes is always terminated by a control word with a leading bit of 1.

From the foregoing description it is evident that a multiport memory system is provided comprised of a plurality of memories connected to a common command and data bus through network bus adapters, and interacting under control of a bus controller connected to one of the multiport memories. Routing of data on the bus, and priority of access to the bus are determined by a stored table in the memory associated with the bus controller. Each multiport memory may have a plurality of devices connected to it for direct memory access, one of which may be a microprocessor. Each multiport memory thus constitutes the nucleus of a center for autonomously carrying out distributed tasks which may be coordinated by the transfer of data between memories under the supervision of the command and data bus.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a distributed data processing system having a plurality of independent centers connected to a bus for performing tasks, and having a source of system clock pulses applied to all centers, each task center being comprised of a memory and a plurality of devices using said memory, one of said devices in each center being a bus adapter coupling said bus to said memory, and one of said devices in one of said centers being a bus controller for control of the transfer of data between task centers, a separate multiport memory architecture for said memory of each task center comprising logic means responsive to said clock pulses for synchronous timing and control of direct access to said memory by devices of the task center, including said bus adapter, a separate device being given access during each of NX clock pulse periods in a predetermined sequence, with selected devices being given access more than once in a sequence, where N is the fixed number of bits in a word to be serially transferred on said bus between centers and X is an integer selected for each task center to satisfy particular needs of the task center, whereby all devices of a task center are given memory access at least once during NX clock pulse intervals.

2. In a distributed data processing system as defined in claim 1 having a source of synchronizing pulses occurring at intervals of some multiple of NX clock pulses for the task center having the largest number X, wherein said direct memory access and control means is resynchronized by said synchronizing pulses.

3. The improvement defined by claim 2 wherein said network bus adapter of each task center is given access by said logic means once during every group of N clock pulses in order for said bus controller to direct a serial N-bit word transfer from one center to one or more centers during every group of N clock pulses which thereby define a serial word time on said bus.

4. A system as defined in claim 1, 2, or 3 wherein said center having said bus controller includes a command interface means as a device coupled to said memory for storing in said memory commands from an external source.

5. A system as defined in claim 4 wherein said multiport memory structure includes an internal address bus and an internal data bus, and each of said devices is coupled to said internal address bus for addressing said memory and each of said devices is coupled to said internal data bus for reading out or storing data in said memory when enabled to do so by said direct memory access timing and control means.

6. A system as defined in claim 5 wherein a device is enabled by said direct memory access timing and control means during its allotted clock pulse interval upon request by a signal acknowledging the request.

7. A system as defined in claim 6 wherein said direct memory access timing and control means of each is comprised of an array of NX AND gates, an array of OR gates, one OR gate for each device of a center, a ring counter means responsive to said clock pulses and resynchronized by said synchronizing pulses for successively enabling said array of NX AND gates, each AND gate having one terminal connected to a different one of NX output terminals of said ring counter means and the other input terminal conected to receive a request signal from a device, some AND gates having the other input terminal connected to the same devices as desired, each OR gate being connected to pass the output signal of all AND gates connected to receive a memory access request signal from the same associated device, each OR gate having its output terminal connected to the associated device to acknowledge the memory access request and enable the associated device to place a memory address on said internal address bus, and to read or write in memory through said internal data bus.

8. A multiport memory comprised of a memory into which data may be stored, and from which data stored may be read out, a bus for data stored and read from said memory, a bus for addressing said memory for storing or reading data, a plurality of devices connected to said address bus and said data bus for access to said memory to read or store, or both read and store data, each device being adapted to generate a request signal when memory access is required, and direct memory access timing and control means for allocating memory access to said devices in a fixed periodic sequence and acknowledging a request by each device during its allocated intervals by an acknowledgement signal to the device requesting access, thereby to enable it to place an address on said address bus and place or accept data on or from said data bus for storing or reading data from said memory.

9. A multiport memory as defined in claim 8 wherein said direct memory access timing and control means is comprised of a source of clock pulses, a ring counter means responsive to said clock pulses for producing at output terminals thereof output signals in repetitive sequence, an array of AND gates, one for each output terminal of said ring counter means, each AND gate having one terminal connected to a different one of said output terminals of said ring counter means, and the other input terminal connected to receive a request signal from a device, some AND gates having the other input terminal connected to the same devices as desired, and an array of OR gates, one OR gate for each device, each OR gate being connected to pass the output signal of all AND gates connected to receive a memory access signal from the same associated device, each OR gate having its output terminal connected to the associated device to transmit the passed request signal as an acknowledgement signal.

* * * * *